Oct. 4, 1949.  R. LEWON ET AL  2,483,498
METHOD OF MAKING CALCAREOUS-SILICIOUS
INSULATING MATERIAL
Filed Oct. 31, 1947  2 Sheets-Sheet 1
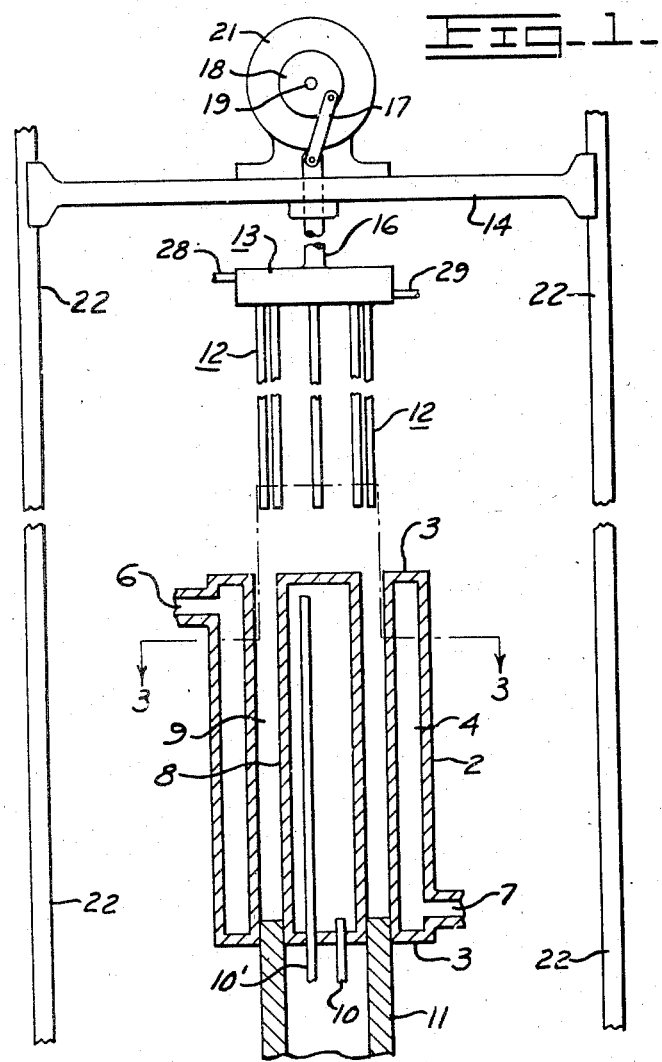
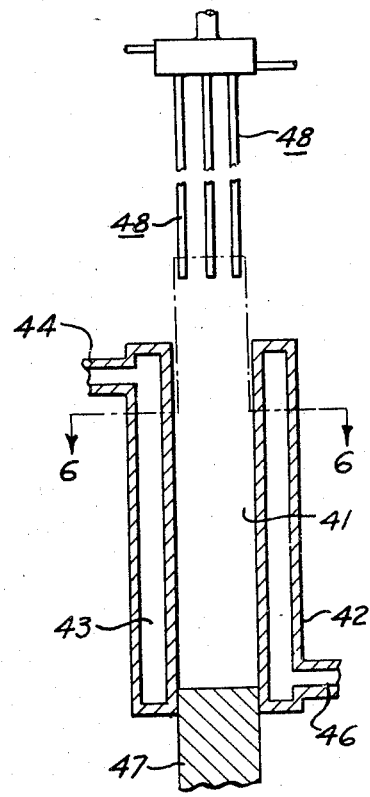
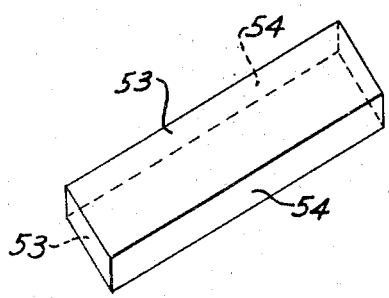
INVENTORS.
RUBIN LEWON
GEORGE P. LECHICH
BY Charles M. Fryer
ATTORNEY.

Oct. 4, 1949.    R. LEWON ET AL    2,483,498
METHOD OF MAKING CALCAREOUS-SILICIOUS
INSULATING MATERIAL
Filed Oct. 31, 1947    2 Sheets-Sheet 2
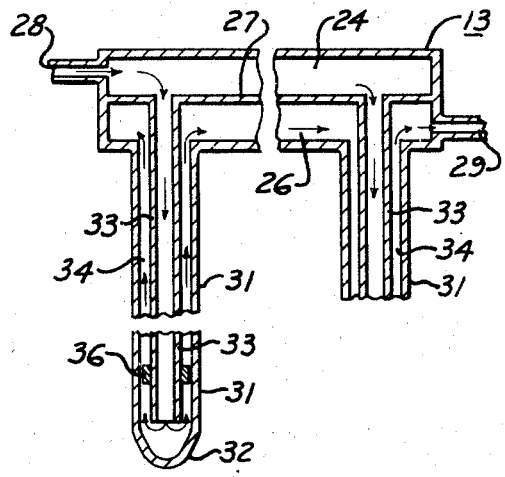
Fig-2-
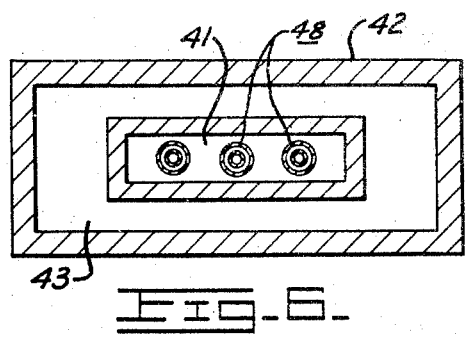
Fig-6-
Fig-3-
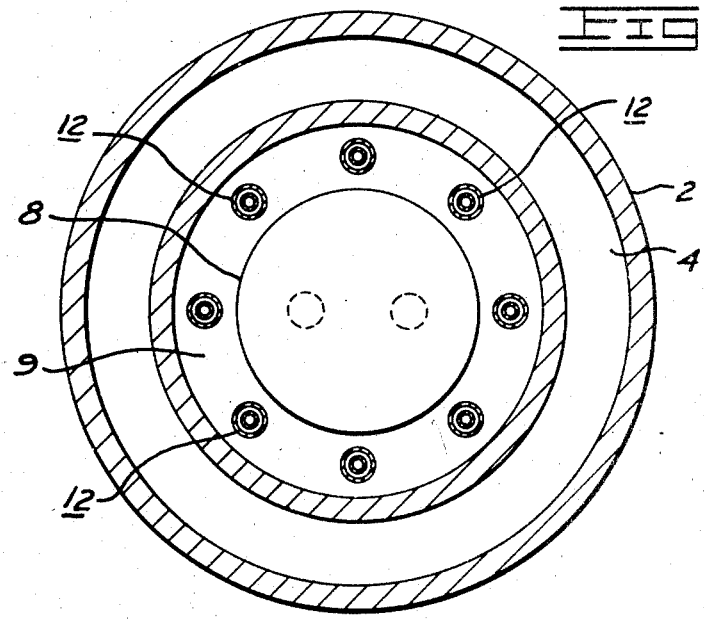
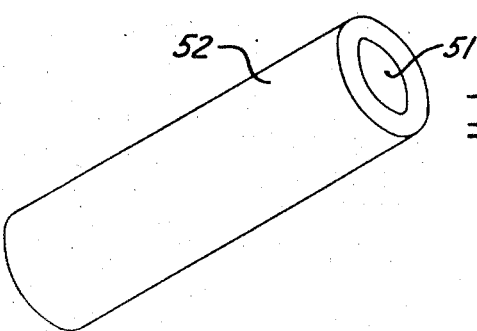
Fig-4-
INVENTORS.
RUBIN LEWON
GEORGE P. LECHICH
BY Charles M. Fryer
ATTORNEY.

Patented Oct. 4, 1949

2,483,498

UNITED STATES PATENT OFFICE 2,483,498

METHOD OF MAKING CALCAREOUS-SILICIOUS INSULATING MATERIAL

Rubin Lewon, Berkeley, and George P. Lechich, Menlo Park, Calif., assignors to The Paraffine Companies, Inc., San Francisco, Calif., a corporation of Delaware Application October 31, 1947, Serial No. 783,407

4 Claims. (Cl. 25—155)

Our invention relates to shaped or molded calcareous-silicious insulating material, and more particularly to an improved method of making such material.

As is disclosed in our assignee's prior co-pending application by Samuel A. Abrahams et al., Serial No. 559,116, filed October 17, 1944, which has issued as Patent No. 2,432,981, December 23, 1947, heat insulating blocks or slabs comprising the shaped reaction product of a calcareous-silicious mixture set to a relatively hard mass by a final indurating step, are well known for use as so-called "high temperature" heat insulation, as they will withstand temperatures well over 1000° F. In this connection, so-called eighty-five percent (85%) magnesia insulation cannot be employed for temperatures much above 500° F. because it commences to break down at about that temperature.

In such prior application, an improved product is obtained by an improved method wherein the reactable calcareous-silicious materials are pre-set from a relatively thin aqueous slurry of the same in heated condition and in a mold to which heat is also applied to maintain the heated condition of the slurry. The slurry is cast into the mold prior to substantial thickening thereof whereby substantially all thickening of the slurry to a self-supporting mass occurs substantially undisturbed in the mold, and the pre-setting to the self-supporting mass is completed in a comparatively short time, in the order of a half hour or less. After the slurry is pre-set to the self-supporting mass, it is removed from the mold and then subjected to an indurating treatment out of the mold.

Because of the pre-setting of the slurry in a comparatively short time, and induration out of the mold, a relatively small number of molds need only be employed to take care of the output of an entire plant, which results in material savings in labor and handling costs compared to prior so called "pan cast" methods wherein the slurry was indurated while in the molds. Furthermore, an improved product is obtained since it is stronger, and the pre-setting molds are of such character as to shape the product substantially to final contour, thus eliminating machining and trimming operations. The pre-set product is thus true to size without shrinkage or warpage.

Heating of the slurry and maintaining the heat in the pre-setting mold are important factors in obtaining the desired rapid pre-setting of the slurry to a self-supporting mass. In the preferred procedure of the Abrahams et al. application referred to, the slurry containing the reactable calcareous and silicious materials is heated to substantially boiling temperature before the slurry is poured into the pre-setting mold, in order to obtain a fast incipient reaction, and thus cooperate in effecting a rapid pre-setting in such mold. Also, the solid ingredients are preferably dry mixed beforehand and then heated water is added thereto.

With such procedure, the slurry commences to thicken quite rapidly as a result of the reaction which occurs among the materials; and since it is important that substantially all thickening occur substantially undisturbed in the pre-setting mold from the time of incipient reaction, and that the slurry be cast into the mold prior to substantial thickening thereof, the heated slurry has to be poured into the mold relatively promptly after the hot water is added to the reactable calcareous-silicious mixture.

Although this procedure is entirely satisfactory in obtaining the desired fast pre-setting and the improved final product, the special care that has to be taken therewith, is not all to be desired from the viewpoint of factory production economy. Our invention is designed to facilitate manufacturing operations with respect to the procedure discussed; and it has as its objects, among others, the provision of an improved method of heating the calcareous-silicious slurry to obviate the care heretofore required in preventing substantial thickening of the slurry prior to pouring thereof into the pre-setting mold, thus facilitating manufacturing operations; which at the same time enables the slurry to be pre-set in the mold, to a self-supporting mass in a comparatively short time with substantially no shrinkage, so that the pre-set product can be indurated out of the mold and the final product will have substantially the exact shape or final contour imparted to it by the mold and also a mold smooth surface over substantially its entire surface area, thus eliminating machining or trimming operations for forming the product to size; and which is simple and economical to perform. Other objects of our invention will become apparent from a perusal of the following description thereof.

In general, we have found that the above described process embodying the rapid pre-setting of the aqueous slurry containing the reactable calcareous and silicious materials, can be effected by applying heat to the slurry after it has been poured into the pre-setting mold—rather than pre-heating the same before it is poured into the mold—and by maintaining the heated condition of the slurry in the mold by applying heat to the mold, so that the slurry will pre-set to a self-supporting mass in a comparatively short time. Such procedure enables the slurry to be formed with room temperature or, in other words, unheated water; and it need not be poured promptly into the mold.

The latter is so because with unheated water, the cold slurry can stand around for a considerable period of time before material thickening thereof occurs. Consequently, larger batches of the slurry can be made, as the slurry can be stored; and since the thickening does not occur rapidly in the cold slurry, this insures that such cold slurry will be poured into the mold before substantial thickening thereof occurs. The cold slurry can be stored for as much as eight hours before any substantial thickening or gelling will occur. Although, we preferably employ unheated water for forming the slurry, water heated to some extent may be employed but then the slurry has to be poured into the mold more promptly.

As one of the desirable features of the pre-setting process is to effect rapid pre-setting in the pre-setting mold, it is desirable that the heat applied to the slurry in the mold be done promptly upon pouring the slurry into the mold, although the heat may be applied some time after pouring the slurry into the mold, but this will increase the length of time of the process. As the means for applying heat to the slurry in the mold, we preferably insert highly heated elements into the slurry filled mold which directly contact the slurry and bring it to a rapid boil, after which these elements are removed. Any suitable means may be employed for heating such elements, such as electrical or gas, but we preferably employ steam under super-atmospheric pressure.

In addition to the reactive calcareous and silicious materials, the slurry contains the usual inert reenforcing fiber, preferably asbestos; and as is disclosed in the aforementioned co-pending application, metal fingers are inserted into the slurry as it is poured into the mold, and a rapid back and forth or reciprocating movement is imparted to such fingers for a short time to orient or straighten out the fiber and hence enhance the strength of the final product. We preferably employ these fingers as the elements for imparting heat to the slurry as it is poured into the mold, by making them hollow so that steam can be conducted therethrough.

As an aid to obtaining the rapid pre-setting of the slurry in the pre-setting mold, in cooperation with the heating of the slurry in the mold, we preferably incorporate a relatively small quantity of a strong alkali in the slurry or reaction vehicle. Such accelerator is preferably a non-carbonate alkali metal alkali, such as sodium or potassium hydroxide, or sodium or potassium silicate. Ammonium hydroxide may be used as the accelerator, but it is not as effective. The employment of the accelerator is especially desirable in our process wherein the slurry is preferably unheated before it is poured into the pre-setting mold, and contains a relatively large volume of water.

From the preceding, it is seen that the aqueous slurry of the reactive calcareous and silicious materials, is cast into the pre-setting mold prior to substantial thickening thereof, in which it is directly heated for a short time to boiling temperature, and the mold is kept hot to maintain the heated condition of the slurry. Thus, the setting reaction is allowed to occur in the mold substantially undisturbed from substantially the time or point of incipient reaction. This causes the bonding formation of the setting mass to occur substantially undisturbed, throughout the entire course of setting, resulting in a final product having a greater strength per unit weight compared to the prior so-called "pan cast" methods wherein the bonding growth is disturbed by pouring of the slurry into the mold after substantial thickening thereof occurs.

The mold in which the slurry of our invention is pre-set, is preferably located at a fixed station, and the mold is preferably provided with a ram or ejector adjacent one end thereof to apply force against the pre-set mass, and cause it to be ejected from the opposite end of the mold, after pre-setting of the mass. Thus by the provision of a relatively small number or groups or batteries of molds located in a fixed location in a plant of relatively large capacity, the entire output of the plant may be accommodated. After pre-setting in the mold and ejection of the pre-set mass therefrom, it is then indurated in the usual manner but in naked form out of the mold.

Preferably the mold is elongated in shape, so that the pre-set mass may be pushed endwise therefrom. Thus, for example, by providing a tubular mold, a tubular final product may be made which is adapted for pipe covering, and such tubular final product will have mold smooth inner and outer arcuate surfaces. Since it will have substantially the exact shape of the mold or in other words conform to the contour of the mold, all that need to be done to provide two matching halves which may be subsequently fitted about a pipe to be insulated, is to cut or split the tube longitudinally in half. In this connection, the product, whether tubular or in slab or block form, is preferably molded so as to be slightly overlength; and to produce the proper length, we cut off either the end of the final product corresponding to the end of the mold from which it is ejected, or both ends thereof should the ram end also require such cutting.

The accompanying drawings illustrate types of such pre-setting molds and products shaped thereby.

In such drawings:

Fig. 1 is a schematic, fragmentary, vertical, sectional elevation of a form of tubular mold and associated frame structure for producing a pre-set tubular mass.

Fig. 2 is a schematic, enlarged fragmentary, vertical section of the mold fingers or heating elements, illustrating the mode of applying heat thereto for heating the slurry after it is poured into the mold, parts being broken away to shorten the view.

Fig. 3 is an enlarged horizontal section taken in planes indicated by line 3—3 in Fig. 1.

Fig. 4 is a perspective view of the tubular mass resulting from the mold of Figs. 1 through 3.

Fig. 5 is a view similar to Fig. 1 but omitting the frame structure, of a pre-setting mold adapted to shape a flat slab.

Fig. 6 is an enlarged horizontal section taken in planes indicated by line 6—6 in Fig. 5.

Fig. 7 is a perspective view of the resultant flat slab shaped by the mold of Figs. 5 and 6.

With reference to Figs. 1 through 3, a form of pre-setting mold for producing a tubular or pipe shaped pre-set mass, comprises a stationary cylinder 2 having closed ends 3, and containing a circumferential space 4 which provides a jacket for circulation of a heating medium, such as hot water or steam, and which during pre-setting of a mass in the mold insures thorough application of heat to the outside surface of such mass. This heating medium is introduced into jacket 4 through inlet pipe connection 7, and it is conducted from the jacket through outlet pipe connection 6. Any suitable heating and circulating means may be provided for causing heating of the heating medium, and flow thereof through jacket 4.

Located within cylinder 2 is a stationary, cylindrically shaped, hollow mandrel 8 which forms in cooperation with the inner wall of cylinder 2, a tubular space or mold cavity 9 into which the slurry of our invention may be poured. The mold walls thus contact substantially the entire surface area of the slurry to be molded to shape the product substantially to final contour. To insure thorough application of heat to the inside surface of the mass in the mold, we also circulate the heating medium through the inside of mandrel 8. This may be readily accomplished by means of a heating medium inlet pipe 10, and an overflow pipe 10' which terminates close to the upper end of the mold. Positioned in the lower end of space 9 is a tubular-like ram or ejector 11 which, when the mass in space 9 has been preset to a firm self-supporting cake, is moved upwardly by any suitable means (not shown) to eject the pre-set mass endwise from the mold, and is moved downwardly to its lowermost position as the mold is filled with slurry.

The slurry poured into the mold usually contains a suitable reenforcing fiber, preferably asbestos but which may be any other suitable reenforcing fiber which is preferably non-inflammable such as other mineral fibers, glass fiber or metallic fiber. To enhance the strength of the final product, it is desirable that these fibers be arranged or oriented longitudinally in the general direction of the axis of the product; and for this purpose, there is preferably provided in association with the mold, a group of circumferentially arranged rods or fingers 12 which are adapted to be inserted into the mold space 9. These fingers are connected to a suitable cross-head 13 which is mounted for slidable reciprocating movement on carriage 14 by means of rod member 16 in turn pivotally connected to connecting rod 17 which is pivotally connected to crank disc 18 mounted on a motor shaft 19 of a suitable electric motor 21 in turn fixedly supported on carriage 14.

Carriage 14 is slidably mounted on tracks 22 of a suitable frame-work and may be moved longitudinally of the mold by any suitable means (not shown) for longitudinal movement of fingers 12 either into or out of the mold. When the mold is to be filled the upper end of ram 11 is preferably positioned adjacent the upper end of the mold; and as the mold is being filled with slurry the ram is moved downwardly to allow the mold to become completely filled with slurry. Simultaneously with downward movement of the ram, the fingers are moved to follow the ram, longitudinally downwardly into the slurry in space 9 until the upper end of the ram is adjacent the bottom of the mold with the lower ends of such fingers in close proximity to the ram 11. At the same time that the fingers are moved longitudinally into the mold as it is being filled with slurry, they are also given a limited but rapid back and forth movement by the described reciprocable mounting of cross-head 13. As a result, the fibers are more or less oriented or straightened out in the slurry in the mold.

Shortly after the mold is completely filled with slurry, the fingers 12 are moved out of the mold to a position where they are out of the way when ram 11 is moved upwardly to eject the pre-set mass from the mold. It is to be understood that the fingers are only brought into action for a short time of preferably approximately one-half minute when the slurry is first poured into the mold.

As previously explained, the fingers 12 are utilized as the elements for applying heat directly to the slurry in the mold and bring it rapidly to a boil. For this purpose, as can be observed from Fig. 2, cross-head 13 is hollow and is divided into an inlet steam compartment 24 and an outlet steam compartment 26, by means of partition wall 27; inlet steam compartment 24 having inlet steam pipe connection 28 which may be connected to any suitable source of steam by flexible piping (not shown), and outlet compartment 26 having similar exhaust steam pipe connection 29.

Each finger is formed of an outer pipe 31 open at its inner end to outlet steam compartment 26 but which is closed at its outer end 32, and also of an inner pipe 33 open at its inner end to inlet steam compartment 24 and which extends in close proximity to the closed end 32 of pipe 31, but which is open at such end. Thus, steam introduced into compartment 24 can flow through the inner pipe 33 and out through the annular space 34 between the inner and the outer pipes, and into exhaust compartment 26 from which the steam is discharged, as is indicated by the direction arrows.

As is explained more fully hereinafter, it is desirable to bring the slurry to boiling as quickly as possible and for a short time. To accomplish this, the steam introduced into the heating elements is at superatmospheric pressure so as to heat these elements quickly to above the boiling temperature of water. To minimize drop of pressure at the lower ends of the fingers, and hence minimize drop in temperature, we preferably employ a throttling sleeve 36 around the inner pipe 33 adjacent to its lower end and which provides only slight clearance between the periphery of the sleeve and the inner surface of pipe 31. Such clearance is in the order of about one-thousandth (0.001") to ten-thousandths (0.010") of an inch depending upon the size of the equipment and the pressure at which the steam is introduced. Also, to impart heat rapidly to the slurry, the fingers are preferably formed of a metal of high heat conductivity such as aluminum, brass or copper. In this connection, the reciprocating motion imparted to the fingers as the mold is being filled with slurry cooperates in imparting heat rapidly to the slurry because the resultant agitation aids in heat transfer.

The mold of Figs. 5 and 6 is essentially the same as that previously described, and the fingers thereof are of the same construction and mounted for movement in the same way as those for the tubular mold. However, the mold of Figs. 5 and 6 is designed for the shaping of a narrow, flat slab of insulating material, and therefore does not contain a stationary mandrel within space 41 in the mold. Such space is surrounded by stationary rectangularly shaped (in cross-section) mold body 42 having heating jacket 43 which communicates with inlet pipe connection 46 and outlet pipe connection 44. Ejector or ram 47 is provided to accomplish the same result as ram 11; and fingers 48 serve the same function as fingers 12.

The process of our invention is applicable to all of the various types and proportions of reactable calcareous and silicious materials heretofore employed in the art for the production of porous high temperature insulation from aqueous slurries containing such materials. There are, however, various factors that enhance our procedure which will now be discussed in greater detail.

As previously related, we preferably incorporate in the slurry a relatively small amount of strong alkali to cooperate with the heating of the slurry in the mold to enhance the thickening or setting of the slurry in the mold. The amount of such accelerator will vary with the type of silicious material employed. In other words, various silicious materials employed in the art for the production of high temperature insulation vary in their reactivity with the calcereous material. Hence, the more reactive the silicious material, the less accelerator is required and vice-versa. Another factor determining the quantity of accelerator is the amount of water in the slurry. Generally, the more water the greater the amount of accelerator. In general, the accelerator may vary in proportion from about ¼% to 5% by weight of the total weight of solid or dry ingredients in the slurry. Sodium hydroxide is the most desirable of the accelerators, and is consequently preferably employed. Besides acting to enhance thickening of the slurry in the mold, the accelerator improves the strength of the final product, and cooperates in avoiding shrinkage of the pre-set product after it is ejected from the mold and subjected to induration.

Because of the direct heating of the slurry in the mold, rather than pre-heating thereof before it is poured into the mold, we need not utilize dry quicklime as the calcareous material, which is the preferred calcareous material referred to in the aforementionel co-pending application. We preferably employ lime hydrate $Ca(OH)_2$ as the calcareous material, although quicklime or any other of the heretofore utilized calcareous materials may be used. As the silicious material, we preferably employ raw uncalcined diatomaceous earth which in its natural condition is finely divided, although any other of the silicious materials which are reactive with the calcareous material may be used, such as calcined diatomaceous earth, clay, shale, marl, moler, granite, sand, pumicite or artificial or natural puzzolanic materials.

Generally, for any given silicious material, the finer the material, the faster will be the reaction with the calcareous material, and to enhance the pre-setting, we preferably employ the silicious material in relatively finely divided state. In this connection, if the silicious material is relatively coarse, so that its reaction with the calcareous material is not relatively rapid, the reaction can be speeded up by increasing the quantity of alkali accelerator.

Since the slurry of our invention need not be preheated before it is poured into the pre-setting mold but is preferably formed cold, the order of mixing of the materials forming the slurry is immaterial; and as previously related, the unheated slurry may be stored for a relatively long time before it need be poured into the pre-setting mold. After formation of the slurry by incorporation of the desired quantity of water which determines the density of the final product—the more water, the lighter the final product, and vice-versa—it is poured into the pre-setting mold.

It can remain in the mold, before it is heated therein but to obtain as rapid pre-setting as possible, we promptly, upon introduction of the slurry into the mold quickly heat the slurry in the mold, and, preferably bring it quickly up to a boil by insertion therein of the heated elements or fingers, which while they are introduced into the mold are also given a rapid reciprocating or back and forth movement to straighten out the reenforcing fiber in the slurry. The time utilized to bring the slurry up to a boil commencing with the moment heat is first applied to the slurry, is relatively important. A slow period of heating of over two or three minutes results in a weaker product; while the faster the heating is effected, the stronger the final product. To obtain such fast heating, we employ a relatively large number of heating fingers for each mold and use relatively high steam pressure to heat such fingers to a high temperature.

To effect the boiling in a short time, the fingers are preferably heated to about 365° F. which, in the embodiment of apparatus illustrated, can be accomplished by steam at about 150 pounds per square inch gage pressure; and the slurry will be brought to a boil within 5 to 10 seconds after the heat is first applied thereto. This results in rapid thickening of the slurry; and after boiling of the slurry for a short time, the heating elements are removed from the mold to terminate the application of heat to the slurry in the mold.

Heating of the slurry in the mold to lower temperatures than boiling can be employed, but this is not as desirable as quickly heating the slurry to a boil. First of all, boiling of the slurry enhances removal of dissolved or entrapped air, by agitation effected by the boiling, and this results in minimizing formation of blow holes or pock marks in the surface of the product during the pre-setting phase in the mold. Secondly, direct heating of the slurry in the mold over a relatively long period, causes too much disturbance of the slurry, resulting in weakening of the final product and possible impairment of the surface appearance of the product because of formation of pock marks. For the same reason, excessive boiling of the slurry after it is first brought to a boil, is detrimental to the strength of the final product. Hence, the boiling should not be for a period much beyond one minute, and preferably not beyond 30 seconds, so that the pre-setting may occur substantially undisturbed after the slurry is poured into the mold.

The direct heating of the slurry in the mold results in rapid thickening or gelling thereof; and to hasten the pre-setting of the slurry to a firm cake in the mold, additional heat is applied to the pre-setting mold while the setting mass is in the mold to maintain the heated condition of the slurry after termination of application of heat thereto. For this purpose, as previously related, the pre-setting mold contains a jacket through which steam or any other suitable heating medium is circulated. The temperature of the pre-setting mold is preferably maintained as close to that of boiling water as possible, without actually arriving at the boiling temperature of water, so as to insure that the slurry will not be disturbed by agitation which would be otherwise effected by continued boiling thereof.

After the initial extremely short time during which the slurry is brought up to boiling temperature and then boiled, it is important that all subsequent pre-setting occur substantially undisturbed in the quiescent state. Otherwise, the strength and appearance of the final product may become impaired. In this connection, the initial boiling of the slurry does not impair the setting because such boiling merely effects a fast incipient reaction, the time of which compared to the total pre-setting time is relatively short, so that the slurry is pre-set in substantially undisturbed condition during substantially the entire pre-setting period. Excessively high heating of the mold may result in pitting of the surface of the setting mass with blow holes, although producing a faster set. Lower temperatures than that of boiling water applied to the mold during the pre-setting will produce a better surface but then the pre-setting may become too slow. A temperature range applied to the mold, of between 180° F. and the boiling temperature of water will be satisfactory for most purposes.

After the mass has set to a firm self-supporting cake in the pre-setting mold, it is easily ejected therefrom by the movable ram. In this connection, the mass will set to a self-supporting cake within a period not over substantially 30 minutes; generally in about 15 to 30 minutes, depending upon the proportions and the specific character of the materials in the mix, and the various other factors discussed previously. Ejection of the pre-set mass from the mold is easily accomplished because even though it is self-supporting, it is still moist; and the moisture provides sufficient lubrication to permit such ejection without damage to the pre-set mass.

As was previously mentioned, substantially no shrinkage occurs in the pre-setting mold, or after the mass is ejected therefrom. In cases where some slight shrinkage might occur, it will rarely be over ¾% by volume, which is not sufficient to preclude production of a final product which has substantially the exact shape of the mold, has the mold smooth surface over substantially its entire area, and which requires no machining or milling operations to trim it to shape. With respect to the tubular product illustrated by Fig. 4, both its inner arcuate surface 51 and its outer arcuate surface 52 are mold smooth and true to shape. As a result, it will provide a final pipe covering after it has been indurated and dried, by cutting it longitudinally in half, and fitting the halves around a pipe of appropriate size.

The flat slab of Fig. 7 has mold smooth opposite side surfaces 53 and side edge surfaces 54, and may be used for so-called "block" insulation. The only portion of a product molded in the manner described, which is not smooth-surfaced, is at the exposed end thereof which is first ejected from the mold. However, this is immaterial because, as previously related, the final product is preferably made slightly overlength; and such end or both ends thereof are generally cut off to produce the desired length.

After ejection from the mold, the self-supporting pre-set mass is now ready for induration which is preferably accomplished in the usual manner as heretofore taught in the art, namely, by application of heat in a saturated atmosphere of moisture, effected by placing the product in an autoclave into which steam under pressure is introduced. This procedure produces the final reaction in the product. The autoclave temperature is primarily determined by economic factors, namely, the cost of steam and high pressure equipment, but too low a temperature should not be employed because this would increase the time of autoclave treatment, and would not provide as strong a final product.

Also, the induration treatment, accomplished in the moisture saturated atmosphere, should be such as to avoid substantial evaporation of moisture from the product while it is undergoing induration. Otherwise, proper final bonding of the set mass may not obtain. Satisfactory results may be obtained during the autoclave induration, at a steam pressure of between 100 and 125 pounds per square inch which corresponds to a temperature of between 338° F. to 350° F. This pressure and corresponding temperature may be varied, as is taught by the art. Under the preferred conditions noted, our product need not be indurated much over two and one-half hours, although longer indurating times may be employed, depending upon the thickness and special characteristics of the product.

After the indurating treatment, the product is removed from the indurator, and is next dried in the usual manner, namely, either by application of artificial heat or by natural drying, until all uncombined moisture is driven off. To expedite the drying operation, the product is preferably dried in any conventional dryer at a temperature of about 350° F. until it is free of uncombined moisture, which will occur in about 24 hours. The resultant product is an extremely strong light weight heat insulating material that will easily withstand temperatures up to 1200° F.

As was previously mentioned, the density of the final product for any given quantity of solid ingredients, is a function of the quantity of water employed in the slurry or mix, the more water the less the density, and vice versa. However, the choice of solid ingredients and their proportions among themselves, are also factors in fixing the density for any given quantity of water; particularly with respect to the character and quantity of silicious material employed. In this connection, we have found that the alkali accelerator in cooperation with the rapid boiling in the pre-setting mold, permit the use of extremely thin slurries in which the total dry solids to water ratio may be as much as about 1 part of total dry solids by weight to about 8 parts of water by weight. So that the final product be not too dense, the slurry should not contain much below about 1 part of total dry solids by weight to about 2 parts of water by weight. With the preferred dry solids to water range, the dry final product will vary from about 8 to about 24 pounds per cubic foot in density.

Our preferred products, which will have a density varying from about 8 to about 24 pounds per cubic foot, are made from the following ingredients in proportions in parts by weight, and according to our preferred procedure, in which diatomaceous earth, solid lime hydrate, fiber and alkali accelerator, are mixed in unheated water to form a slurry which is poured into the pre-setting mold wherein it is promptly heated for a short time, and the heating of the mold is maintained until the pre-setting of the mass to a firm cake is effected:

Raw uncalcined diatomaceous earth____ 40 to 60
Dry lime hydrate_____ 30 to 45
Reenforcing fiber (preferably asbestos)_ 10 to 20
Pre-setting accelerator (preferably sodium hydroxide)_____ ¼ to 5

The water to dry solids ratio may vary from about 2 to about 8 parts of water by weight to about 1 part by weight of the total amount of dry solids. A small amount of relatively inert coloring material, such as iron oxide (FeO$_3$), up to about 1 part by weight of the total amount of dry solids, may be incorporated in the slurry, to give the final product a distinctive color appearance, if so desired.

Our preferred composition is made from the following ingredients in about the following parts by weight, and in accordance with our preferred procedure:

| | |
|---|---|
| Raw uncalcined diatomaceous earth | 45.0 |
| Dry lime hydrate | 38.0 |
| Asbestos fiber | 14.5 |
| Sodium hydroxide | 2.0 |
| Coloring matter (iron oxide (Fe$_2$O$_3$)) | 0.5 |

The water to the dry solids ratio is about 4½ parts of water by weight to about 1 part by weight of the total amount of dry solids. Preferably all the dry ingredients are mixed together with unheated water. The resultant unheated slurry may be stored and then transferred into the pre-setting mold, or it may be poured into such mold promptly upon formation thereof. Preferably, promptly upon pouring the slurry into the mold, it is quickly brought up to boiling and boiled for about thirty seconds, by the heated elements inserted into the slurry, whereupon heating of the slurry is terminated but the temperature of the mold is maintained between about 200° F. and 212° F. to maintain the heated condition of the slurry.

The pre-setting in a quiescent state to a firm self-supporting mass is effected in about 15 to 25 minutes, after which the pre-set product is ejected from the mold, and then indurated out of the mold in the usual manner, and finally dried until free of uncombined moisture. The resultant porous product has a final density of about 11.5 pounds per cubic foot.

We claim:

1. In the method of making a light weight mass of porous heat insulating material from an aqueous slurry containing reactable calcareous and silicious materials, wherein the slurry is pre-set in a mold to a firm self-supporting mass, and after such pre-setting is removed from the mold and subjected to an indurating treatment out of the mold; the steps comprising utilizing a mold which is adapted to be heated, pouring the slurry into said mold, heating the slurry in the mold for a relatively short time by insertion of heated elements directly into the slurry in the mold and to which elements heat is supplied in an amount sufficient to effect substantial thickening of said slurry, removing said heated elements from said slurry before substantial pre-setting of the slurry occurs, and in addition to applying heat to said slurry by said heated elements applying heat to the mold and maintaining the mold heated during the pre-setting period which continues after the heated elements are removed.

2. In the method of making a light weight mass of porous heat insulating material from an aqueous slurry containing reactable calcareous and silicious materials, wherein the slurry is pre-set in a mold to a firm self-supporting mass, and after such pre-setting is removed from the mold and subjected to an indurating treatment out of the mold; the steps comprising utilizing a mold which is adapted to be heated, pouring the slurry into said mold, heating the slurry in the mold for a relatively short time by insertion of heated elements directly into the slurry in the mold and to which elements heat is supplied in an amount sufficient to bring said slurry to a boil and effect substantial thickening of said slurry, removing said heated elements from said slurry before substantial pre-setting of the slurry occurs, and in addition to applying heat to said slurry by said heated elements applying heat to the mold and maintaining the mold heated during the pre-setting period which continues after the heated elements are removed.

3. In the method of making a light weight mass of porous heat insulating material from an aqueous slurry containing reactable calcareous and silicious materials and reenforcing fiber for the final product, wherein the slurry is pre-set in a mold to a firm self-supporting mass, and after such pre-setting is removed from the mold and subjected to an indurating treatment out of the mold; the steps comprising utilizing a mold which is adapted to be heated, pouring the slurry into said mold, heating the slurry in the mold for a relatively short time by insertion of heated elements directly into the slurry in the mold and to which elements heat is supplied in an amount sufficient to effect substantial thickening of said slurry, while said heated elements are inserted into the mold imparting to them a limited but rapid back and forth movement to orient the reenforcing fiber for enhancing the strength of the final product, removing said heated elements from said slurry before substantial pre-setting of the slurry occurs, and in addition to applying heat to said slurry by said heated elements applying heat to the mold and maintaining the mold heated during the pre-setting period which continues after the heated elements are removed.

4. In the method of making a light weight mass of porous heat insulating material from an aqueous slurry containing reactable calcareous and silicious materials, wherein the slurry is pre-set in a mold to a firm self-supporting mass, and after such pre-setting is removed from the mold and subjected to an indurating treatment out of the mold; the steps comprising incorporating an alkali accelerator in the slurry to enhance said pre-setting of the slurry, utilizing a mold which is adapted to be heated, pouring the slurry into said mold in substantially unheated condition, heating the slurry in the mold for a relatively short time by insertion of heated elements directly into the slurry in the mold and to which elements heat is supplied in an amount sufficient to effect substantial thickening of said slurry, removing said heated elements from said slurry before substantial pre-setting of the slurry occurs, and in addition to applying heat to said slurry by said heated elements applying heat to the mold and maintaining the mold heated during the pre-setting period which continues after the heated elements are removed.

RUBIN LEWON.
GEORGE P. LECHICH.

REFERENCES CITED

The following references are of record in the file of this patent:

UNITED STATES PATENTS

| Number | Name | Date |
|---|---|---|
| 2,432,981 | Abrahams et al. | Dec. 23, 1947 |